C. F. TERHUNE.
FLY TRAP.
APPLICATION FILED OCT. 23, 1913.
1,091,717.  Patented Mar. 31, 1914.
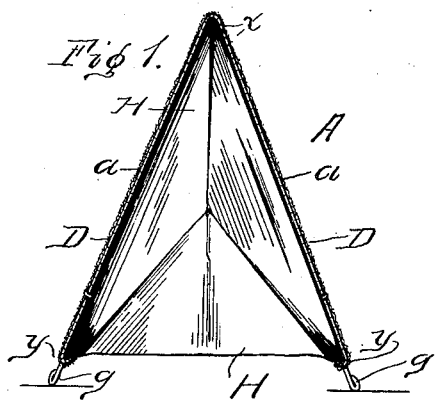
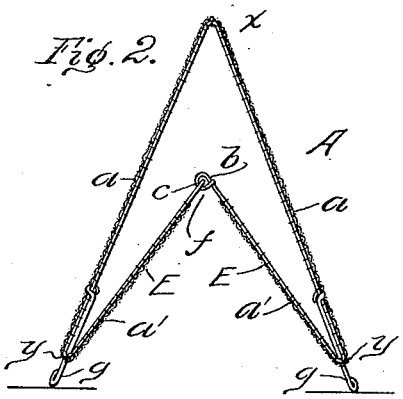
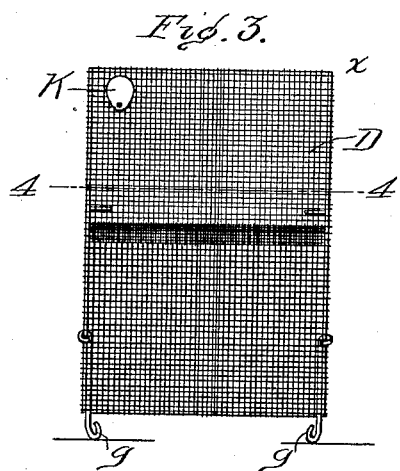
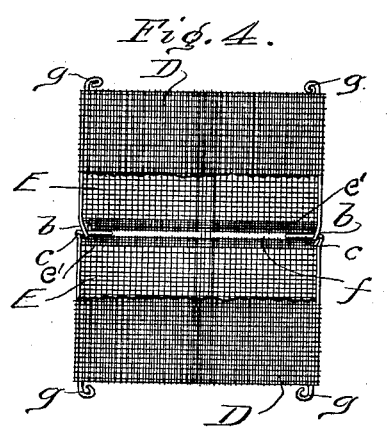
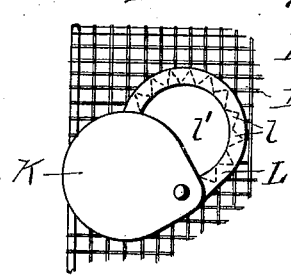
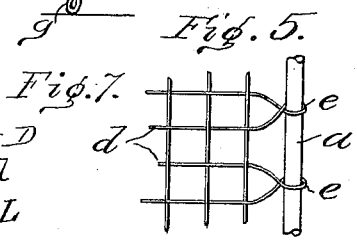
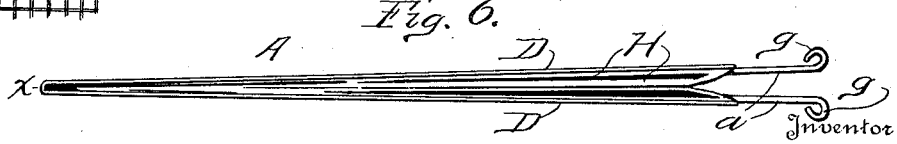
Witnesses
L. N. Gillis
John F. Hardie
Inventor
Cornelius F. Terhune
By E. B. Clark
Attorney

UNITED STATES PATENT OFFICE.

CORNELIUS F. TERHUNE, OF CLINTON, IOWA.

FLY-TRAP.

1,091,717.  Specification of Letters Patent.  Patented Mar. 31, 1914.

Application filed October 23, 1913.  Serial No. 796,909.

*To all whom it may concern:*

Be it known that I, CORNELIUS F. TERHUNE, a citizen of the United States, residing at Clinton, in the county of Clinton and State of Iowa, have invented certain new and useful Improvements in Fly-Traps, of which the following is a specification.

This invention relates to fly traps, and the principal object is to provide a trap of simple, inexpensive construction, which is collapsible and will open automatically by means of its spring rod end-frames.

Another object is to provide a trap of this character in which the transverse mesh wires of the reticulated material forming the sides of the trap are turned in loops around or over the spring rods composing the end frames, whereby no applied fastening devices will be required in connecting the sides with the end frame members.

The features of construction constituting my invention will be set forth in the claims.

I will now describe the details of construction of my improved trap by reference to the accompanying drawings, in which—

Figure 1 represents an end elevation with the textile fabric in place. Fig. 2 represents a similar view with the end fabric removed for showing my spring rod end frame. Fig. 3 represents a side elevation showing a door at the top of the trap. Fig. 4 represents a horizontal section on line 4—4, Fig. 3. Fig. 5 represents an enlarged detail view showing the transverse mesh wires of the side walls looped around the spring rod of the end-frame members of the trap. Fig. 6 represents an end view of the trap in a collapsed horizontal position. Fig. 7 represents an enlarged detail view of a door and frame applied to the side of the trap.

In constructing my collapsible and automatically opening trap A, I provide spring rods or wires for the end frames, each composed of the outer diverging members $a$, $a$, formed by bending the rod approximately at the middle $x$, forming the apex of the trap, and the interior inclined members $a'$, $a'$, formed by bending both ends of the rod at $y$, $y$ inward and upward. The upper extremity of one member is formed into an eye $b$ and the other extremity is bent into an engaging hook $c$, by means of which the two members may be loosely connected. Both end frames are thus formed by a single spring rod bent and connected into two V-shaped portions which may be set up in inverted position, and which will open automatically, due to the resilience of the spring rod.

The shell or covering of the trap is preferably reticulated material, as wire cloth, for the side walls and a soft flexible material, as textile fabric, for the end walls. A single sheet of wire cloth of a suitable width and length is bent into the shape of the end frame members to form the sides D, D, and the interior inclined guard flaps E, E. The wire cloth may be secured to the end frame members in any desired manner, but to avoid the use of clamping strips and rivets and to provide a neat smooth finish, I preferably weave the wire cloth onto the spring end frame rods at each side, by turning the transverse wires $d$ of the mesh into loops $e$, around the rods $a$, thus forming an attachment for each pair of mesh wires $d$ to the rod and making a strong durable construction, free from rough edges, and providing material which may be readily shaped and embodied into a fly trap at small expense. The cloth of the guard flaps E, E is not extended to the upper ends of the members $a'$, $a'$, but is stopped a quarter inch or more below the eye $b$ and hook $c$, so as to form an entrance slot $f$ between the upper edges of the flaps. The edge of each flap is preferably bent over and lapped upon itself to strengthen the edges of the slot, as shown at $e'$, Fig. 4.

Any soft pliable material, preferably a light textile fabric, is cut into V shape to form the ends H of the trap, and is sewed or otherwise fastened to the end-frame members.

The trap is provided at its four lower corners with legs $g$ for supporting the body a short distance above a table or shelf on which it is set. For the legs short lengths of wire are thrust up through the mesh of wire cloth adjacent to the bends $y$ in the frame rods and at a short distance above their upper ends are twisted into loops around the frame rods and through the mesh of the sides, thereby holding the legs in place. Legs may also be formed by using a double thickness of the wire cloth E E in such a way that the extreme ends of the wire cloth or fabric may be turned back to permit the projection of the frame wires beyond the points $y$, thus forming the supports for the trap.

In one of the side walls D, near the top is secured a frame and door for the removal of dead flies. A frame L, Fig. 7 is made by cutting the central part of a metal plate into sharp-pointed segments $l$, and these are bent at right angles to the frame and then thrust through a hole in the wire cloth and bent over and down upon the inner face of the cloth. An opening $l'$ is thus formed which may be closed by a swinging door K pivotally connected to the frame in any well known manner and frictionally held in closed position. This door and frame may be secured at any other desired point in the side or end walls.

When the trap is out of use it may be collapsed as shown in Fig. 6 and laid away, and when desired for use, it may be set on its legs and spread into the inverted V shape shown in Figs. 1 and 2. In the collapsed condition the traps can be conveniently and economically packed for shipping and storing.

Having described my invention, what I claim, and desire to secure by Letters Patent, is:

1. A collapsible fly trap comprising spring rod end frames bent to form outer V-shaped wall members and interior guard members connected together, reticulated material connecting the end frames to form the side walls and guard flaps, the end walls of textile fabric attached to the end frames, whereby the side walls and guard flaps may be collapsed.

2. A collapsible fly trap comprising spring rod end frames bent centrally at the apex of outer V-shaped wall members, and near their outer ends bent inward to form interior guard members, the extremities being formed, one with an eye and the other with an engaging hook for connecting them together, reticulated material connecting the end frames to form the side walls and guard flaps, said flaps being separated at their upper edges to form an entrance slot, and end walls of textile fabric attached to the end frames whereby the walls and guard flaps may be collapsed.

3. A collapsible fly trap comprising spring rod end frames and connecting reticulated material with the transverse mesh wires looped around said rods at the opposite ends, said rods and material being bent to form diverging side walls and interior guard flaps loosely connected at their upper ends to provide an entrance slot between the edges of the flaps, and end walls of flexible material.

In testimony whereof I affix my signature in presence of two witnesses.

CORNELIUS F. TERHUNE.

Witnesses:
 EUGENE R. MULLETT,
 ANETA P. RASMUSSEN.